United States Patent
Riesbeck (10) Patent No.: US 10,778,776 B2
(45) Date of Patent: Sep. 15, 2020

(54) COMPUTING INFRASTRUCTURE SCALABILITY ASSESSMENT

(71) Applicant: Aetna Inc., Hartford, CT (US)

(72) Inventor: Mark Riesbeck, Tolland, CT (US)

(73) Assignee: Aetna Inc., Hartford, CT (US)

( * ) Notice: Subject to any disclaimer, the term of this patent is extended or adjusted under 35 U.S.C. 154(b) by 126 days.

(21) Appl. No.: 15/720,981

(22) Filed: Sep. 29, 2017

(65) Prior Publication Data

US 2019/0104183 A1    Apr. 4, 2019

(51) Int. Cl.
| | | |
|---|---|---|
| *H04L 29/08* | (2006.01) | |
| *H04L 29/06* | (2006.01) | |
| *H04L 12/26* | (2006.01) | |
| *G06F 11/34* | (2006.01) | |

(52) U.S. Cl.
CPC ........ *H04L 67/125* (2013.01); *G06F 11/3409* (2013.01); *H04L 43/04* (2013.01); *H04L 67/10* (2013.01); *H04L 67/1002* (2013.01); *H04L 67/42* (2013.01); *H04L 43/0817* (2013.01)

(58) Field of Classification Search
CPC .................................................... H04L 67/125
USPC ......................................................... 709/224
See application file for complete search history.

(56) References Cited

U.S. PATENT DOCUMENTS

| | | | | |
|---|---|---|---|---|
| 6,601,233 B1 * | 7/2003 | Underwood | ............... | G06F 8/24 717/100 |
| 6,640,238 B1 * | 10/2003 | Bowman-Amuah | ... | G06F 9/541 709/201 |
| 6,731,314 B1 * | 5/2004 | Cheng | ................... | G06F 16/954 715/848 |
| 7,600,007 B1 * | 10/2009 | Lewis | .................... | G06Q 10/04 709/223 |
| 8,346,929 B1 * | 1/2013 | Lai | ......................... | G06Q 10/10 709/226 |
| 8,606,905 B1 * | 12/2013 | Martin | ...................... | G06F 8/60 709/224 |
| 10,078,465 B1 * | 9/2018 | Wu | ......................... | G06F 3/061 |

(Continued)

*Primary Examiner* — Ondrej C Vostal
(74) *Attorney, Agent, or Firm* — Leydig, Noit & Mayer, Ltd.

(57) ABSTRACT

Embodiments of the disclosure provide a method of assessing scalability of a computing infrastructure performed by a scalability server, the scalability server comprising a processor to execute computer executable instructions stored on a non-transitory computer readable medium, so that when the instructions are executed, the server performs the method comprising: (a) receiving growth data from one or more client devices, the growth data including growth projection of subunits of an organization; (b) receiving application and infrastructure information from a database, the application and infrastructure information including a list of application and infrastructure resources of the computing infrastructure; (c) determining scalability of the computing infrastructure using the growth data and the application and infrastructure information; (d) monitoring real-time performance of the computing infrastructure; and (e) determining a priority of infrastructure components to be upgraded using the scalability of the computer infrastructure, the real-time performance of the computing infrastructure, the growth data, and the application and infrastructure information.

11 Claims, 6 Drawing Sheets

(56) References Cited

U.S. PATENT DOCUMENTS

| | | | | |
|---|---|---|---|---|
| 2002/0107957 | A1* | 8/2002 | Zargham | G06Q 10/06 709/224 |
| 2005/0257196 | A1* | 11/2005 | Hollander | G06F 9/45512 717/115 |
| 2006/0233346 | A1* | 10/2006 | McIlwaine | G06Q 10/06 379/265.02 |
| 2011/0225513 | A1* | 9/2011 | Lauwers | G06F 3/16 715/756 |
| 2012/0124199 | A1* | 5/2012 | Mahesh | G06F 9/5083 709/224 |
| 2013/0065562 | A1* | 3/2013 | Singh | H04L 12/1492 455/414.1 |
| 2013/0080641 | A1* | 3/2013 | Lui | H04L 43/045 709/226 |
| 2014/0047106 | A1* | 2/2014 | Leung | H04L 41/5012 709/224 |
| 2014/0244488 | A1* | 8/2014 | Kim | G06Q 20/02 705/39 |
| 2014/0351436 | A1* | 11/2014 | Tenner | G06F 11/3457 709/226 |
| 2015/0067403 | A1* | 3/2015 | Naseh | G06F 11/1438 714/37 |
| 2015/0067809 | A1* | 3/2015 | Madani | H04L 63/0815 726/8 |
| 2015/0088978 | A1* | 3/2015 | Motukuru | H04L 67/148 709/203 |
| 2016/0048900 | A1* | 2/2016 | Shuman | G06Q 30/0631 705/7.33 |
| 2016/0132828 | A1* | 5/2016 | Hartung | G06Q 10/103 705/7.39 |
| 2017/0006135 | A1* | 1/2017 | Siebel | H04L 67/02 |
| 2017/0046206 | A1* | 2/2017 | Kofkin-Hansen | G06F 9/45533 |
| 2017/0093675 | A1* | 3/2017 | Chuang | H04L 41/0896 |
| 2017/0140465 | A1* | 5/2017 | Stouse | G06Q 30/0201 |
| 2017/0149681 | A1* | 5/2017 | Chen | G06F 9/46 |
| 2017/0155628 | A1* | 6/2017 | Rohloff | H04L 9/30 |
| 2017/0257285 | A1* | 9/2017 | Scholz | H04L 41/5032 |
| 2017/0337498 | A1* | 11/2017 | Rahimi | G06Q 10/06375 |
| 2018/0062941 | A1* | 3/2018 | Brown | H04L 41/5003 |
| 2018/0077243 | A1* | 3/2018 | Mathew | H04L 67/143 |
| 2018/0131563 | A1* | 5/2018 | Purushothaman | H04L 41/0604 |
| 2018/0278612 | A1* | 9/2018 | Pattar | H04L 63/10 |

* cited by examiner

| | Applications That Serve Members | Current Members Served | Projected Member Growth | Current Infrastructure Performance | Scalability Information | | |
|---|---|---|---|---|---|---|---|
| | | | | | 50% | 75% | 85% |
| Business Unit 402-1 | App01 | 1 mil | 4 mil | 0.1 | 0.1 | 0.1 | 0.2 |
| | App02 | | | 0.1 | 0.3 | 0.8 | 1.5 |
| | App03 | | | 0.2 | 0.7 | 1 | 4 |
| Business Unit 402-2 | App04 | 0.5 mil | 1 mil | 0.4 | 0.8 | 1.5 | 2 |
| | App01 | | | 0.1 | 0.1 | 0.1 | 0.1 |
| | App05 | | | 0.3 | 0.6 | 0.7 | 0.9 |
| Business Unit 402-3 | App05 | 0.25 mil | 0.75 mil | 0.2 | 0.3 | 0.3 | 0.3 |
| | App02 | | | 0.1 | 0.1 | 0.1 | 0.1 |

FIG. 5

Report

602

| | Application (Status) |
|---|---|
| Not Scalable to 50% | App04(YEL) |
| Not Scalable to 75% | App02(YEL), App03(RED), App04(RED) |
| Not Scalable to 85% | App02(RED), App03(RED), App04(RED), App05(YEL) |

604

| | Application Priority Ranking |
|---|---|
| 1 | App04 |
| 2 | App03 |
| 3 | App02 |
| 4 | App05 |

606

| | Business Unit Priority Ranking |
|---|---|
| 1 | Business Unit 402-1 |
| 2 | Business Unit 402-2 |
| 3 | Business Unit 402-3 |

608

| | Infrastructure Priority Ranking (Direction) |
|---|---|
| 1 | Memory (increase) |
| 2 | Storage (increase) |
| 3 | Network Traffic (decrease) |
| 4 | Servers (increase) |

| | Applications That Serve Members | Current Members Served | Projected Member Growth | Scalability Information (×N) | |
|---|---|---|---|---|---|
| | | | | Degradation Threshold | Failure Threshold |
| Business Unit 702-1 | App01 | 1 mil | 4 mil | 400% | 450% |
| | App02 | | | 60% | 90% |
| | App03 | | | 50% | 75% |
| Business Unit 702-2 | App04 | 0.5 mil | 1 mil | 75% | 90% |
| | App01 | | | 800% | 900% |
| | App05 | | | 25% | 40% |
| Business Unit 702-3 | App05 | 0.25 mil | 0.75 mil | 50% | 80% |
| | App02 | | | 240% | 360% |
| | | | | | |

FIG. 8

COMPUTING INFRASTRUCTURE SCALABILITY ASSESSMENT

BACKGROUND

Enterprise systems include servers, storage and associated software deployed in a large scale that may serve as an information technology (IT) infrastructure for businesses, governments, or other large organizations. Enterprise systems manage large volumes of data and are designed to offer and provide high levels of transaction performance and data security. These systems are also designed to support business processes, information flows, data analytics, and other functions. Enterprise systems include various individual system assets and resources. The IT infrastructure including these system assets and resources may be upgraded by adding and/or replacing hardware and/or software resources.

BRIEF SUMMARY

An embodiment of the disclosure provides a method of assessing scalability of a computing infrastructure performed by a scalability server, the scalability server comprising a processor to execute computer executable instructions stored on a non-transitory computer readable medium, so that when the instructions are executed, the server performs the method comprising: (a) receiving growth data from one or more client devices, the growth data including growth projection of subunits of an organization; (b) receiving application and infrastructure information from a database, the application and infrastructure information including a list of application and infrastructure resources of the computing infrastructure; (c) determining scalability of the computing infrastructure using the growth data and the application and infrastructure information; (d) monitoring real-time performance of the computing infrastructure; and (e) determining a priority of infrastructure components to be upgraded using the scalability of the computer infrastructure, the real-time performance of the computing infrastructure, the growth data, and the application and infrastructure information.

Another embodiment of the disclosure provides a scalability server for assessing scalability of a computing infrastructure, the scalability server comprising a processor to execute computer executable instructions stored on a non-transitory computer readable medium, so that when the instructions are executed, the server is configured to: (a) receive growth data from one or more client devices, the growth data including growth projection of subunits of an organization; (b) receive application and infrastructure information from a database, the application and infrastructure information including a list of application and infrastructure resources of the computing infrastructure; (c) determine scalability of the computing infrastructure using the growth data and the application and infrastructure information; (d) monitor real-time performance of the computing infrastructure; and (e) determine a priority of infrastructure components to be upgraded using the scalability of the computer infrastructure, the real-time performance of the computing infrastructure, the growth data, and the application and infrastructure information.

Yet another embodiment of the disclosure provides a non-transitory computer readable medium containing computer executable instructions for causing a scalability server to assess scalability of a computing infrastructure by: (a) receiving growth data from one or more client devices, the growth data including growth projection of subunits of an organization; (b) receiving application and infrastructure information from a database, the application and infrastructure information including a list of application and infrastructure resources of the computing infrastructure; (c) determining scalability of the computing infrastructure using the growth data and the application and infrastructure information; (d) monitoring real-time performance of the computing infrastructure; and (e) determining a priority of infrastructure components to be upgraded using the scalability of the computer infrastructure, the real-time performance of the computing infrastructure, the growth data, and the application and infrastructure information.

DETAILED DESCRIPTION

Embodiments of the disclosure provide systems and methods of supporting business growth of an organization by continually monitoring and reviewing how well the IT infrastructure of the organization scales. The embodiments review business growth projections, infrastructure capacity, and application scalability headroom to provide real-time analytics and recommendations on where to focus the organization's funds and resources. The embodiments of the disclosure provide an organization's senior management and/or board with real-time analytics and decision-making capability on how to allocate funding and resources to support business plans and growth.

Embodiments of the disclosure may be leveraged by any organization that uses IT infrastructure, customizable applications, and internally developed applications and scripts. Many organizations have limited or no insight into real-time infrastructure and application analytics. Without real-time infrastructure and application analytics, these organizations may not spend financial resources or capital in the most efficient way to support growth. Embodiments of the disclosure provide systems and methods to automatically monitor an organization's IT infrastructure, including applications, and make real-time adjustments to ensure business growth is supported when needed. The embodiments also assess applications in real-time and identify potential scalability bottlenecks and issues in advance so that these can be addressed in a timely manner By using embodiments of the disclosure, real-time infrastructure and application adjustments may be made to support business growth while keeping down operational expenses.

Figure 1:
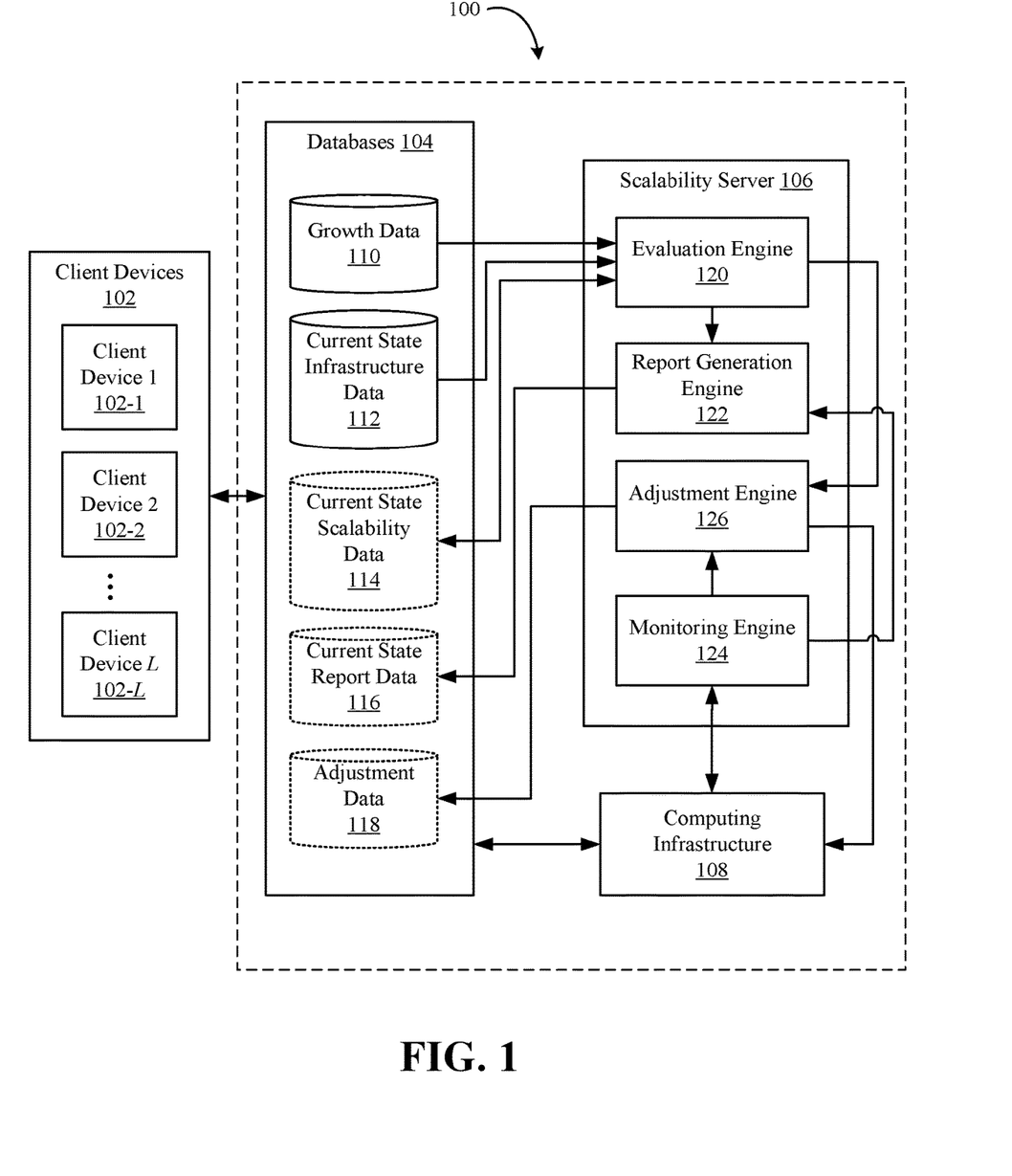
FIG. 1 illustrates a system level diagram showing client devices interfacing with an enterprise system with a scalability server according to some embodiments of the disclosure.

FIG. 1 illustrates a system level diagram showing client devices 102 interfacing with an enterprise system 100 with a scalability server 106 according to certain embodiments of the disclosure. The scalability server 106 utilizes one or more databases 104 and interfaces with computing infrastructure 108. Client devices 102 depicted in FIG. 1 include client device 1 102-1 through client device L 102-L. Examples of client devices 102 includes desktop computers and mobile devices such as laptops, smartphones, tablets, phablets, etc. Client devices 102 submit jobs to be run on the computing infrastructure 108. FIG. 1 depicts an embodiment where the jobs submitted to computing infrastructure 108 are provided to databases 104 before being pulled from computing infrastructure 108. In other embodiments, the databases 104 does not serve as an intermediary, and the computing jobs may be submitted directly from client devices 102 to computing infrastructure 108. Also depicted in FIG. 1 is databases 104 serving as an intermediary between the scalability server 106 and the client devices 102. It is understood that the go-between role the databases 104 serve between the scalability server 106 and the client devices 102 may be accomplished by local storage on either of client devices 102 or the scalability server 106. For example, client devices 102 may send data from their local storage directly to scalability server 106. And scalability server 106 may send data directly to client devices 102, and the data can then be stored on the local storage of client devices 102.

Computing infrastructure 108 includes one or more servers. An example of a server that may be included in computing infrastructure 108 is provided in FIG. 2. Computing infrastructure 108 may also be extended with cloud computing where the one or more servers are not physically present in the same location. Computing infrastructure 108 is a generalization of an enterprise system or a collection of enterprise systems. Computing infrastructure 108 receives computing jobs, parameters, etc., from client devices 102, and runs these computing jobs invoking software necessary to complete the jobs.

Databases 104 serve as information storage. Databases 104 is labeled and represented in FIG. 1 as a collection of databases, but it is understood that one database may hold the various data stored in databases 104. Databases 104 may include growth data 110, current state infrastructure data 112, current state scalability data 114, current state report data 116, adjustment data 118, and other data forms. The dotted databases holding scalability data 114, report data 116, and adjustment data 118 are optional. Growth data 110 includes, for example, growth projection data which shows how much an organization, a department within an organization, an activity categorization of an organization, or some other subunit will grow. Examples of activity categorization in a health insurance organization may be Medicare-related activities, premium-class medical insurance activities, preventative-care medical insurance activities, etc. Growth projection data may be based upon expected growth in financial revenues, expected growth in number of customers, expected growth of medical plan sponsors, expected growth of new business/renewal quotes, and so on. Growth projection data may be stored per business unit (or department) in an organization, and may be mostly membership based, for example, expected growth in number of customers per business unit.

Current state infrastructure data 112 includes a list of applications available in computing infrastructure 108, system assets and resources in computing infrastructure 108, and the relationship between a subunit of an organization and the applications and resources utilized in computing infrastructure 108. Infrastructure data 112 may include voice systems, database servers, web servers, card readers, cameras, disk storage, memory, datacenter cooling/power/space, backup/archiving, disaster recovery, messaging, monitoring/automation, desktop, and sometimes shared with business units. Infrastructure data 112 is data on how current infrastructure performs given the current state of the different subunits or business units in an organization. Infrastructure data 112 may be organized by infrastructure system components and may be assessed based upon its ability to scale.

Current state scalability data 114 includes data about how well an application identified in infrastructure data 112 can accommodate an increase in infrastructure usage by a subunit of an organization (assessment). Scalability is current state of the union; scalability utilizes user input, automated and manual assessments of application and infrastructure are possible. For example, a performance metrics team scripts out scenarios and push applications to limits to see if the applications scale based on certain criteria, for example, doubling the amount of users.

Current report data 116 includes, for example, a priority list for infrastructure resources in computing infrastructure 108 to be updated. Adjustment data 118 includes, for example, settings for real-time infrastructure adjustments. Adjustment data 118 may include settings to appropriate additional servers, processors, memory, storage, or other resources in computing infrasturcture 108 to a certain subunit of an organization. Adjustment data 118 include software settings that may be employed to better utilize computing infrastructure 108.

Scalability server 106 retrieves growth data 110 and infrastructure data 112 to determine scalability data 114. That is, the scalability server 106 uses the growth data 110 and the infrastructure data 112 to determine how well the computing infrastructure 108 will support future growth, storing this information as scalability data 114. Then using the growth data 110, the infrastructure data 112, the scalability data 114, and real-time status of the computing infrastructure 108, the scalability server 106 generates the report data 116 and/or the adjustment data 118. That is, using these different data as inputs, the scalability server 106 determines a priority list of which subunits of an organization should receive upgrades in computing resources and stores this information as report data 116. In some embodiments, if parameter adjustments can be made to computing infrastructure 108 to meet growth requirements, these new adjustment parameters settings, or tweaks are provided as adjustment data 118. The scalability server 106 includes several functional units that aid realizing the functions ascribed to the scalability server 106. The evaluation engine 120 combines growth data 110 and infrastructure data 112 to determine scalability data 114. The report generation engine 122 receives from the evaluation engine 120 growth data 110, infrastructure data 112, and scalability data 114 and receives from the monitoring engine 124 real-time performance of the computing infrastructure 108 to generate the report data 116. The adjustment engine 126 also receives, from the evaluation engine 120, the growth data 110, the infrasturcture data 112, and the scalabilty data 114, and, from the monitoring engine 124, real-time performance of the computing infrastructure 108 and generates the adjustment data 118. The monitoring engine 124 receives real-time performance application performance and resource utilization of the computing infrastructure 108.

Figure 2:
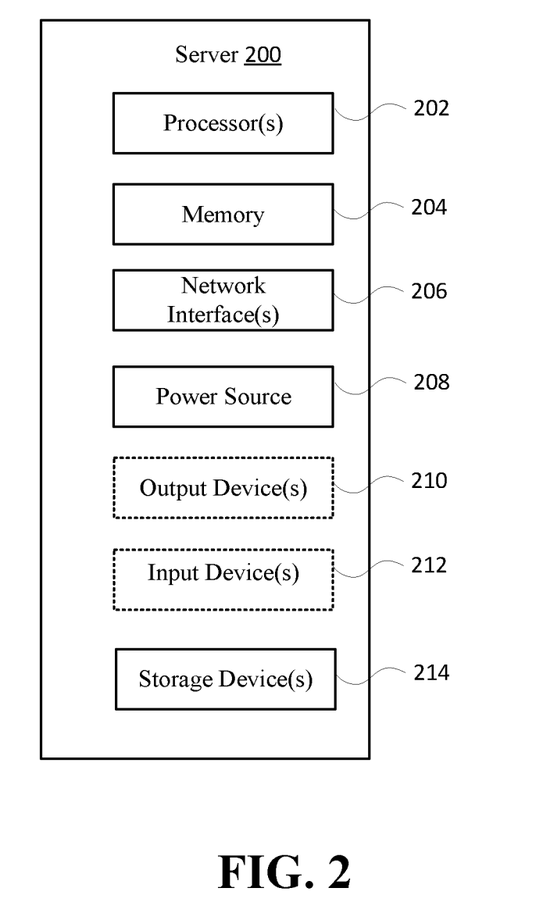
FIG. 2 illustrates components of a server according to an embodiment of the disclosure.

FIG. 2 illustrates components of a server 200 according to an embodiment of the disclosure. The server 200 may include one or more processors 202, memory 204, network interfaces 206, power source 208, output devices 210, input devices 212, and storage devices 214. Although not explicitly shown in FIG. 2, each component provided is interconnected physically, communicatively, and/or operatively for inter-component communications in order to realize functionality ascribed to the server 200. To simplify the discussion, the singular form will be used for all components identified in FIG. 2 when appropriate, but the use of the singular does not limit the discussion to only one of each component. For example, multiple processors may implement functionality attributed to processor 202.

Processor 202 is configured to implement functions and/or process instructions for execution within server 200. For example, processor 202 executes instructions stored in memory 204 or instructions stored on a storage device 214. In certain embodiments, instructions stored on storage device 214 are transferred to memory 204 for execution at processor 202. Memory 204, which may be a non-transient, computer-readable storage medium, is configured to store information within server 200 during operation. In some embodiments, memory 204 includes a temporary memory that does not retain information stored when the server 200 is turned off. Examples of such temporary memory include volatile memories such as random access memories (RAM), dynamic random access memories (DRAM), and static random access memories (SRAM). Memory 204 also maintains program instructions for execution by the processor 202 and serves as a conduit for other storage devices (internal or external) coupled to server 200 to gain access to processor 202. Processor 202 includes, for example, one or more microprocessors or microcontrollers.

Storage device 214 includes one or more non-transient computer-readable storage media. Storage device 214 is provided to store larger amounts of information than memory 204, and in some instances, configured for long-term storage of information. In some embodiments, the storage device 214 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The server 200 may comprise multiple network interfaces 206 to facilitate communication via multiple types of networks. Network interfaces 206 may comprise network interface cards, such as Ethernet cards, optical transceivers, radio frequency transceivers, or any other type of device that can send and receive information. Non-limiting examples of network interfaces 206 include radios compatible with several Wi-Fi standards, 3G, 4G, Long-Term Evolution (LTE), Bluetooth®, etc.

Power source 208 provides power to the server 200. For example, the server 200 may include a regulator for regulating power from the power grid when the server 200 is plugged into a wall outlet.

In some embodiments, server 200 may also be equipped with one or more output devices 210. Output device 210 is configured to provide output to a user using tactile, audio, and/or video information. Examples of output device 210 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to user 104.

In some embodiments, server 200 is equipped with one or more input devices 212. Input devices 212 are configured to receive input from user 104 or the environment where server 200 resides. In certain instances, input devices 212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for server 200 are functionally and communicatively coupled to achieve certain behaviors. In some embodiments, these behaviors are controlled by software running on an operating system of server 200. The client devices 102, the databases 104, the scalability server 106, and the computing infrastructure 108 may include one or more computer devices similar to server 200. The input devices 212 and the output devices 210 may be used by the scalability server 106 to receive direct inputs and provide direct outputs to a power user with physical access to the scalability server 106.

Figure 3:
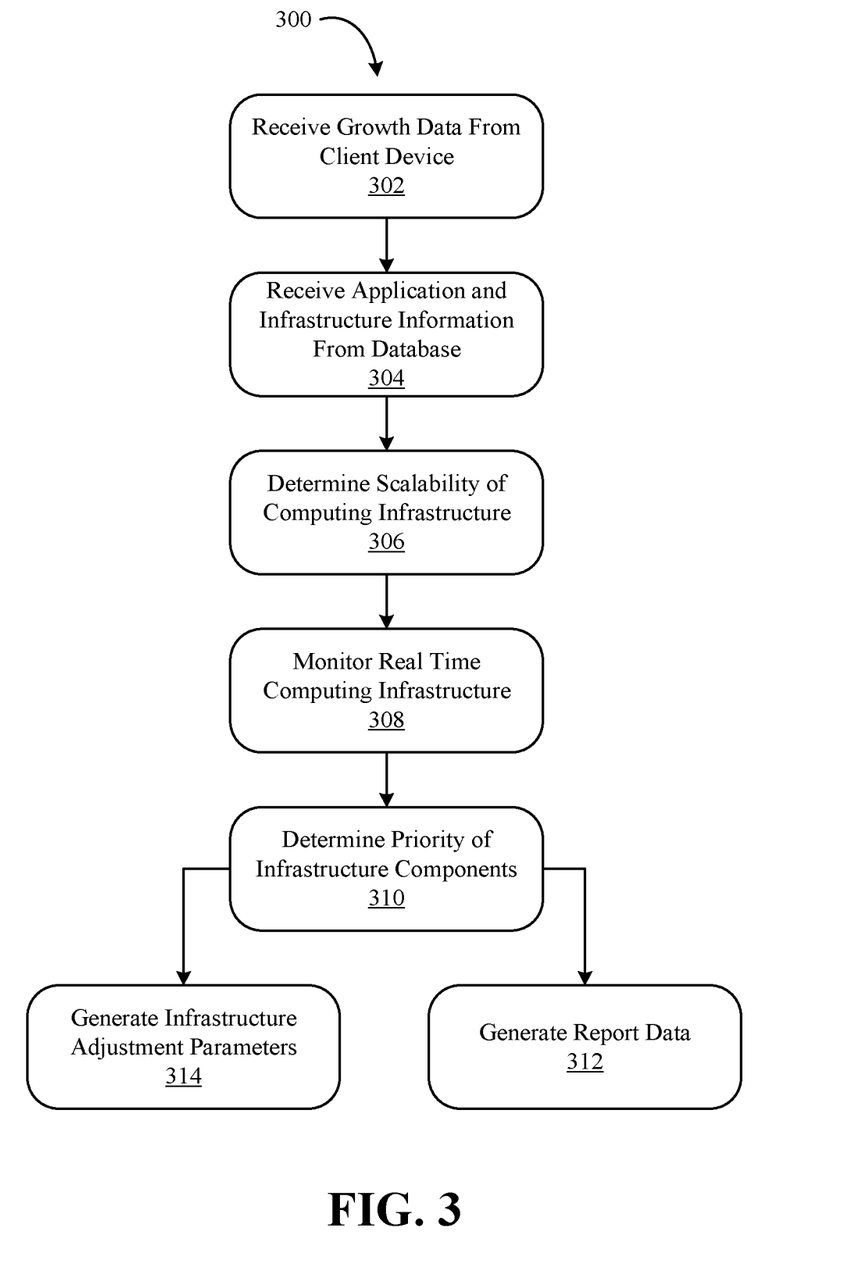
FIG. 3 illustrates a process for assessing scalability of an infrastructure of an enterprise system according to an embodiment of the disclosure.

FIG. 3 illustrates a process 300 for assessing scalability of an infrastructure, for example, computing infrastructure 108, of an enterprise system according to an embodiment of the disclosure. At step 302, the scalability server 106 receives growth data from at least one of the client devices 102. The growth data is provided by the client devices 102 to the databases 104 and stored as growth data 110. The evaluation engine 120 in scalability server 106 retrieves from databases 104, the growth data 110. In a health service or health insurance organization, the growth data 110 may be growth projection data retrieved from a financial systems database. The growth projection data is organized in a fashion that provides growth projection for each subunit of the health insurance organization.

At step 304, the scalability server 106 receives application and infrastructure information from the databases 104. The evaluation engine 120 retrieves the application and infrastructure information stored as the infrastructure data 112 from databases 104. The application and infrastructure information may be a list of applications and resource usage in the computing infrastructure 108 for each application. The application and infrastructure information may also include information associated with each subunit of the health insurance organization. For example, the list of applications and infrastructure resources may be identified as a percentage of the resources available in the computing infrastructure 108.

At step 306, the scalability server 106 determines scalability of the computing infrastructure 108. In some embodiments, this step involves retrieving scalability data 114 from databases 104. The scalability data 114 includes scalability assessment results data. Scalability assessment results data is obtained by the evaluation engine 106 by using the infrastructure data 112 to determine how well the applications are performing with the current infrastructure settings in computing infrastructure 108. If the applications are performing well, then the growth data 110 is taken into account by the evaluation engine 120. Using a scorecard and the forecast provided by the growth data 110, the evaluation engine 120 determines whether the applications will continue to perform well under new conditions. For example, if 1,000,000 members are currently being supported but growth projection data shows that 5,000,000 members will need to be supported, the scalability server 106 will determine how well the current applications will run in the current infrastructure when 5,000,000 members are supported. The evaluation engine 120 utilizes speed metrics and thresholds to determine whether an application and the computing infrastructure 108 needs to be scaled to accommodate projected future growth in growth data 110. This information is stored as scalability data 114 in databases 104. The scalability data 114 may include color categorization for applications that perform well (green color), applications that perform moderately well (yellow color), and applications that do not perform well (red color).

At step 308, the scalability server 106 monitors real-time performance of the computing infrastructure 108. The monitoring engine 124 probes the computing infrastructure 108 to determine real-time utilization data from the computing infrastructure 108. The monitoring engine 124 collects information on server usage, database usage, network traffic, memory usage, storage, and any other resources in the computing infrastructure 108. The monitoring engine 124 not only collects information on hardware component usage, but also collects real-time information on application performance data from impacted applications. Impacted applications are applications identified in the infrastructure data 112 by the evaluation engine 120 to be impacted by a future growth according to the growth data 110. Application performance data may include number of claims processed, number of calls received, number of bills generated, and so on. Each application's application performance data may include different metrics, for example, a failure threshold for the number of claims processed per unit time for one application may be higher than a failure threshold for the number of claims processed per unit time for a second application. Application performance data captures how well applications are performing, for example, online response time, nightly batch runtime with service level agreements, time to generate a quote/proposal, claims processing time, and so on.

At step 310, the scalability server 106 determines a priority of infrastructure components in computing infrastructure 108. The evaluation engine 120 along with the monitoring engine 124 utilize the growth data 110, the infrastructure data 112, the scalability data 114, and the real-time monitoring statistics to determine a priority of infrastructure components. The scalability server 106 may also determine a priority of applications in the computing infrastructure 108.

At step 312, the report generation engine 122 creates a report with the priority of infrastructure components and/or the priority of applications using inputs from the evaluation engine 120 and the monitoring engine 124. The report data 116 holds the priority information which may include specific recommendations, for example, increasing memory, storage, central processing units, etc., to accommodate future growth according to the growth data 110. The report data 116 also provides priority information regarding which applications need to be updated to accommodate future growth. This information allows an organization, for example, a health insurance organization to properly allocate financial resources for application development to facilitate future growth.

At step 314, the adjustment engine 126 generates infrastructure adjustment parameters for the computing infrastructure 108. For example, dedicated servers in the computing infrastructure 108 may be allocated from serving only one application or subunit of an organization to serving multiple applications and/or subunits of an organization. The adjustment engine 126 generates parameters to tweak, allocate, and divide current resources in the computing infrastructure 108 to meet future growth demands according to growth projection data in the growth data 110. The adjustment engine 126 may make real-time infrastructure adjustments to provide additional servers, processors, memory, storage, etc., to one or more subunits of an organization.

Figure 4:
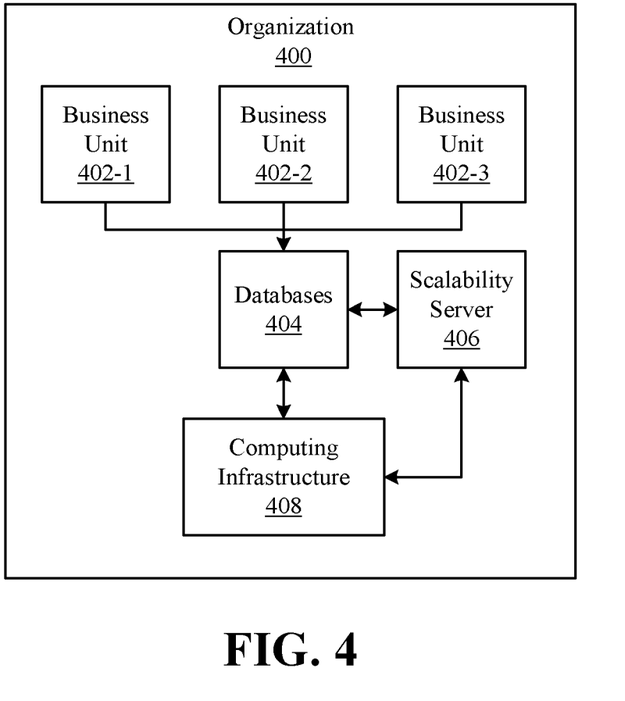
FIG. 4 illustrates an example organization with a scalability server according to some embodiments of the disclosure.

FIG. 4 illustrates an example organization 400 with a scalability server 406 according to some embodiments of the disclosure. The organization 400 includes three business units, business unit 402-1, business unit 402-2, and business unit 402-3. The business units interface to the computing infrastructure 408 to run applications using databases 404. Scalability server 406 utilizes information in databases 404 and computing infrastructure 408 to assess scalability of the computing infrastructure 408 according to some embodiments of the disclosure. Databases 404 may be organized as databases 104 of FIG. 1, and scalability server 406 is an embodiment of scalability server 106 of FIG. 1. The business units may include one or more client devices or computing resources.

Figure 5:
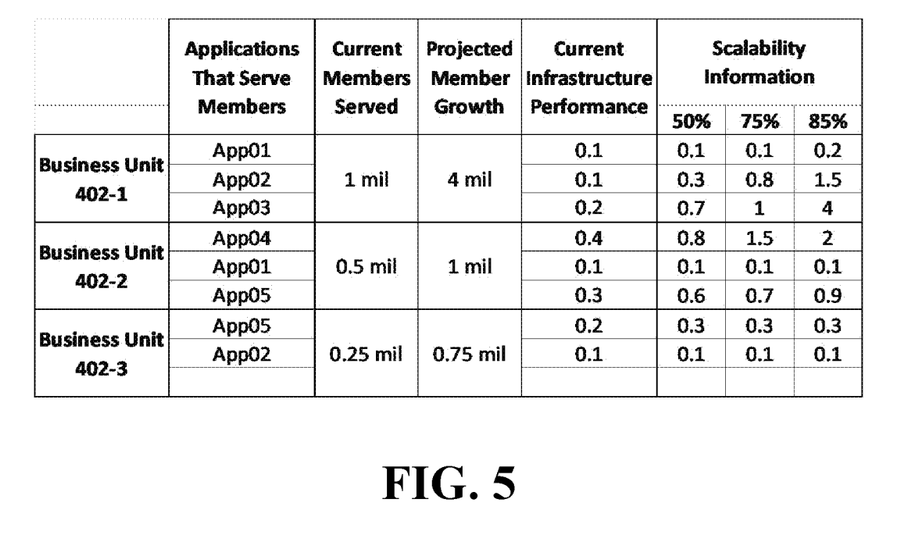
FIG. 5 illustrates example data for the organization in FIG. 4.

FIG. 5 illustrates example data for the organization in FIG. 4. In FIG. 5, each business unit runs one or more software applications on the computing infrastructure 408 to serve members or customers of the organization. For example, business unit 402-1 currently uses three applications—App01, App02, and App03—to serve 1 million members. "Applications that serve members" refers to the applications used by a business unit to perform tasks that enable the service the business unit is providing. "Current members served" refers to the current load of the business unit.

The organization 400 expects to grow, that is, handle more load in the future, for example, in the next year. "Projected member growth" refers to the expected load in the next year. "Projected member growth" is growth data stored in databases 404. For example, business unit 402-1 is expected to serve 4 million members next year compared to only 1 million members this year. "Current infrastructure performance" refers to the time it takes for each application in the business unit to serve its current members. For example, in business unit 402-1, App03 serves 1 million members in 0.2 time units. In this example, performance is quoted as delay or time units, but it is understood that performance may also be quoted as speed or frequency. "Infrastructure performance" may be stored in databases 404 as current infrastructure data 112 when considering the architecture of FIG. 1.

"Scalability information" is infrastructure performance of each application when considering fractional membership growth. For example, business unit 402-1 is expected to grow from 1 million members to 4 million members, representing a 4× growth rate. Another way to view this is that an additional 3 million members will be added, thus representing a 3 million member increase over the current members served. Under "scalability information", the 50% column represents the time units or delay associated with an application serving current members plus 50% of the projected growth in members. For example, business unit 402-1 is expected to add 3 million members, thus, under the 50% column, App03 would take 0.7 time units to serve 1 million members+3 million members×50% which is equal to 2.5 million members. In business unit 402-2, an additional 0.5 million members are being added, so that means it would take 0.8 time units to serve 0.5 million members+0.5 million members×50% which is equal to 0.75 million members. Similar interpretations and calculations can be made for the 75% and 85% data. The three tiered scalability information—50%, 75%, and 85%—are provided as examples. In some embodiments, only one tier is provided, or only two tiers are provided, or a number greater than three can be provided. "Scalability information" may be stored in databases 404 as current scalability data 114 when considering the architecture of FIG. 1.

In performing step 302, the scalability server 406 receives growth data stored in databases 404. The growth data includes the projected member growth identified in FIG. 5, and the assessment for the projected member growth was generated by each of the business units. In performing step 304, in addition to receiving the growth data, the scalability server 406 also retrieves current infrastructure performance and scalability information.

In step 306, the scalability server 406 determines the scalability of the computing infrastructure 408 using the scalability information and the current infrastructure performance. In some embodiments, this step involves providing thresholds for noticeable degradation and failure and comparing infrastructure and scalability data against those thresholds. For example, a degradation threshold may be set as 0.8 time units and a failure threshold set at 1.0 time units. When assessing the infrastructure data (current infrastructure performance), none of the applications in any of the business units are above the degradation threshold or above the failure threshold. In some embodiments, degradation thresholds and failure thresholds, respectively, may be set differently for different applications. For example, 0.8 time units and 1.0 time units for AppX, and 1.1 time units and 1.6 time units for AppY.

The scalability server 406 then continues to assess the scalability of the computing infrastructure 408 using the scalability information. At 50% scalability, the scalability server 406 determines that under business unit 402-2, App04 is at the degradation threshold while the other applications are below both the degradation and the failure thresholds. App04 may be marked with a scalability status. For example, App04 may be marked as "yellow" thus indicating that performance of App04 degrades in response to an increase in current members of business unit 402-2 by 50%.

A similar analysis is performed for the 75% scalability data. The scalability server 406 finds that App02 is at 0.8 under business unit 402-1, and App03 is at 1 exceeding the failure threshold of 1.0 time units. App02 is marked as "yellow" and App03 is marked as "red". The process continues for all business units for both the 75% and the 85% scalability data.

Figure 6:
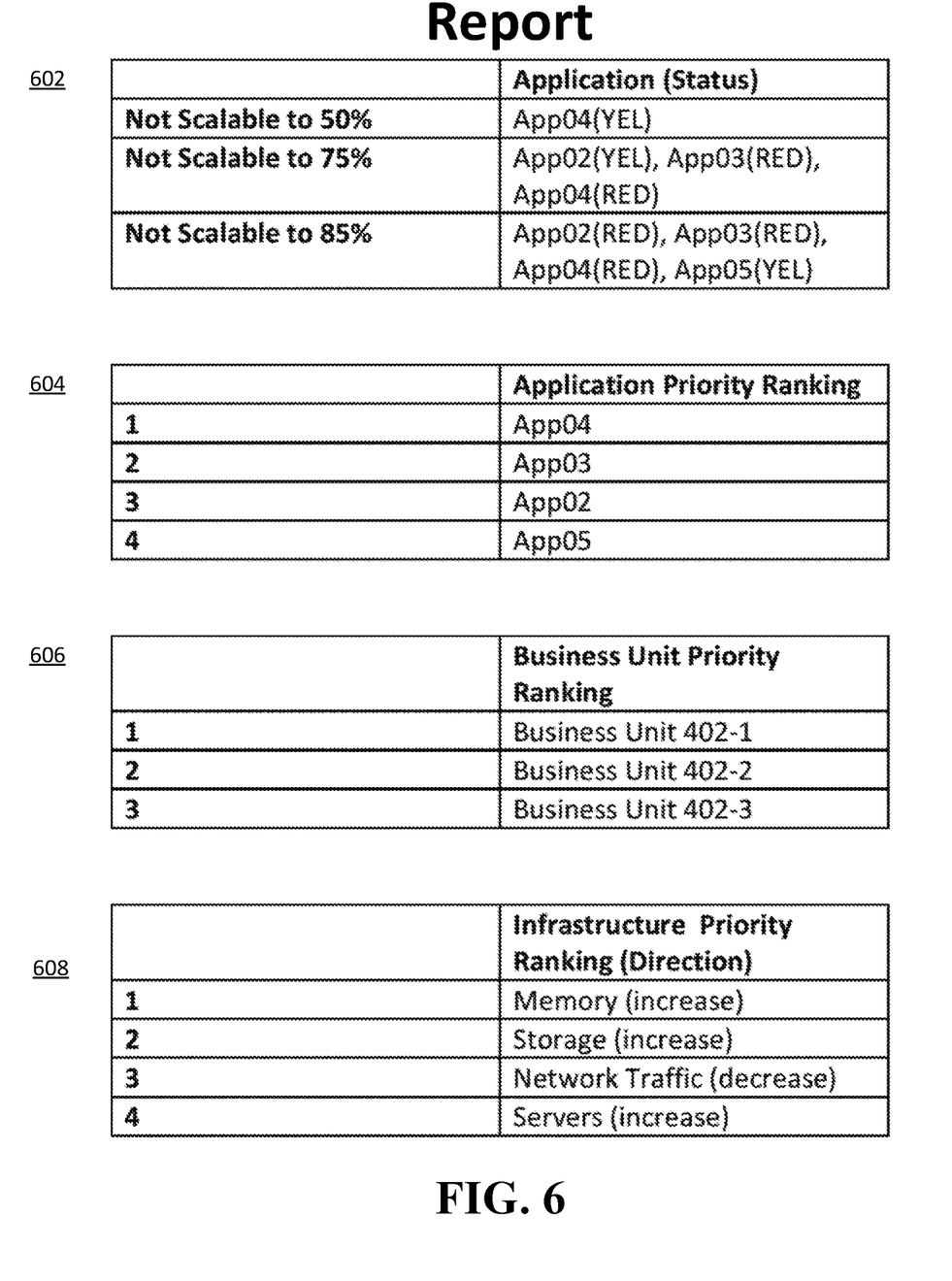
FIG. 6 illustrates example report data generated according to some embodiments of the disclosure.

FIG. 6 illustrates example report data generated according to some embodiments of the disclosure. Report data includes current infrastructure report showing assessment of scalability. In the previous example, report 602 may be generated to identify which applications had performance degradations or failed. Report 604 may be generated to rank applications by funding resource priority indicating an order of how application updates should be performed. Report 606 may be generated to rank business units by funding resource priority indicating an order of which business units would be mostly crippled if the number of members grew by the amount specified in the projected member growth information. These reports may be stored as report data when considering the architecture of FIG. 1. These reports are provided as examples, and other reports may be generated.

For example, a report showing computing resource usage of each application and a bottleneck resource may be provided. The bottleneck resource may be memory, number of processors, speed of processor, speed of hard drive, speed of memory, and so on. Thus, by identifying the bottleneck for each application, adjustment parameters may be generated to allocate, for example, more memory for App03 since App03 is runs low on memory thereby causing it slow down significantly.

FIG. 6 also provides a report 608 that may be generated. In an exemplary implementation, referring to the example of FIGS. 4 and 5, App04 is classified as a memory intensive application that when running on computing infrastructure 108, reaches App04's memory threshold, and App02 and App03 are classified as contributing to a large percentage of network traffic. Additionally, with the expected growth projection in FIG. 5, the organization 400 will require additional storage to hold additional member data.

Report 608 provides a report that may be generated by the report generation engine 122. Report 608 provides a priority ranking for infrastructure components based on the growth projection. Report 608 may be generated in concert with report 604 and/or report 602 and/or report 606. For example, since App04 holds the highest application priority ranking in report 604 and App04 is a memory intensive application, adding more memory resources to computing infrastructure 408 may be ranked as the highest infrastructure priority. In some embodiments, in a cloud computing setting where computing infrastructure 408 includes reconfigurable cloud resources, additional memory resources may be requested in set increments. For example, if App04 is determined to require more memory in order to meet scalability thresholds, the adjustment engine 126 may create adjustment data including additional memory needed to meet the scalability thresholds. That is, report 608 may be generated with a recommendation to increase memory and stored in report data, and memory adjustment parameters may be generated with additional memory recommendation and stored in adjustment data. Adjustment data may then be used by computing infrastructure 408 to provision additional memory to App04.

In another embodiment, additional storage may be needed to meet projected member growth. In a similar manner as outlined above for memory adjustment, report 608 may indicate that storage resource should be increased. In a cloud computing environment, adjustment engine in the scalability server 406 may generate adjustment data indicating the amount of storage increase to accommodate the projected member growth.

In another embodiment, network traffic in computing infrastructure 408 may reduce overall performance of App02 and App03 since these applications are classified as network traffic intensive applications. Scalability server 406 may rank network traffic as a third priority and utilize mutliple ways of reducing network traffic. For example, the scalability server 406 may determine that increase in memory may reduce network traffic but not to an acceptable threshold level for scalability. Scalability server 406 may then add an increased number of servers in the report 608. The servers may be for example, memory and storage intensive servers so that when App02 or App03 is running on the servers most of the data transfer necessary for the proper functioning of the application is contained on the single memory and storage intensive server, thus reducing amount of network traffic. In a cloud computing environment, the computing infrastructure 408 may request additional servers to become part of its infrastructure. Adjustment data may be stored in databases 404 indicating parameters for the type of server preferred, for example, a server with large memory and storage capacity.

Figure 7:
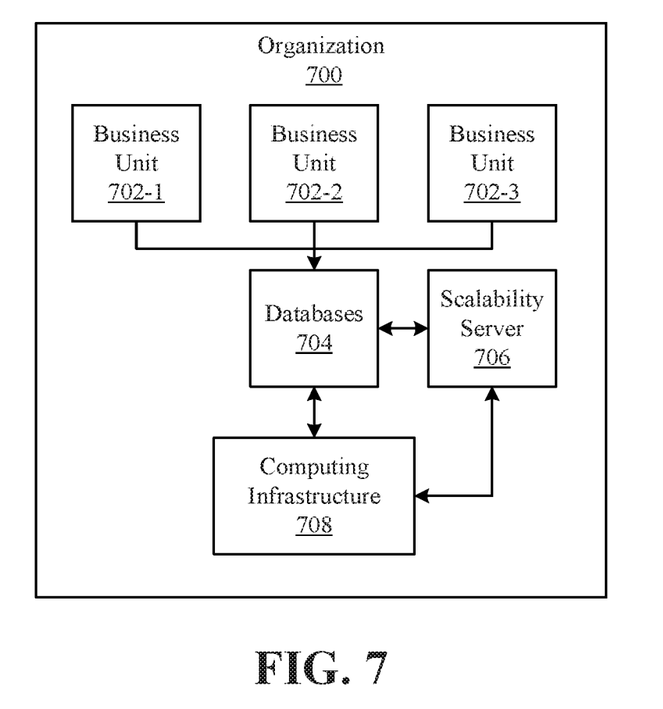
FIG. 7 illustrates an example organization with a scalability server according to some embodiments of the disclosure.

FIG. 7 illustrates an example organization 700 with a scalability server 706 according to some embodiments of the disclosure. The organization 700 includes three business units, business unit 702-1, business unit 702-2, and business unit 702-3. The business units interface to the computing infrastructure 708 to run applications using databases 704. Scalability server 706 utilizes information in databases 704 and computing infrastructure 708 to assess scalability of the computing infrastructure 708 according to some embodiments of the disclosure. Databases 704 may be organized as databases 104 of FIG. 1, and scalability server 706 is an embodiment of scalability server 106 of FIG. 1. The business units may include one or more client devices or computing resources.

Figure 8:
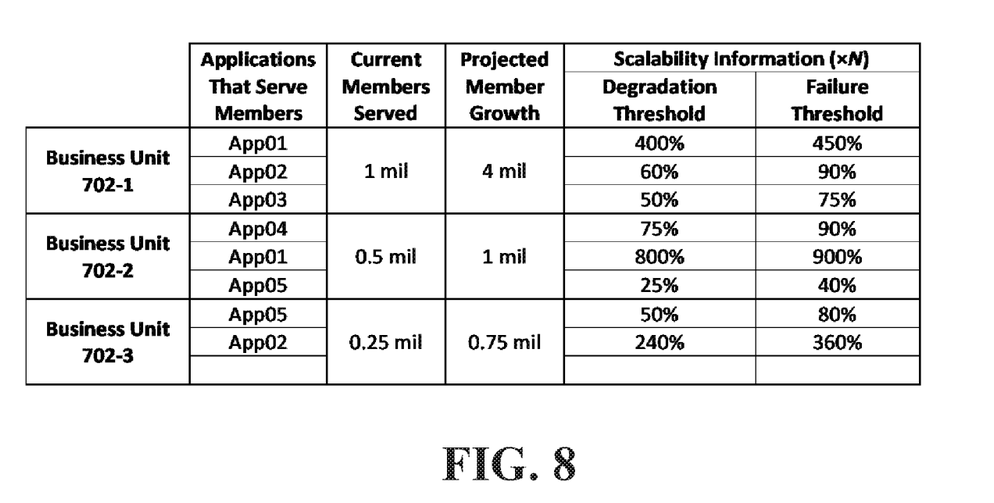
FIG. 8 illustrates example data for the organization in FIG. 7.

FIG. 8 illustrates example data for the organization in FIG. 7. FIG. 8 shows that in some embodiments, instead of providing delay performance metrics as in FIG. 5, current state scalability data obtained from the databases 704 may be summarized as degradation thresholds and failure thresholds. In the embodiment of FIG. 8, degradation threshold may be defined as an application's ability to scale by a factor of N before the application starts having performance issues. N here may be an integer, for example, 2, 3, 4, and so on. The degradation threshold values in FIG. 8 are provided for the case where N=2, thus in FIG. 8, degradation threshold of 60% quoted for App02 under Business Unit 702-1 indicates that App02 can support 50% more of its currently served members before App02 starts having performance issues. In a similar manner in the embodiment of FIG. 8, failure threshold may be defined as an application's ability to scale by a factor of N before the application fails. Since the failure threshold values in FIG. 8 are provided for the case where N=2, thus in FIG. 8, failure threshold of 90% quoted for App02 under Business Unit 702-1 indicates that App02 can support 90% more of its currently served members before App02 starts having performance issues. Note that for N=2, a degradation threshold of 100% indicates that an application can support 2× its current members served before the application exhibits performance issues. In a similar manner, a failure threshold of 100% indicates that an application can support 2× its current members served before the application fails.

In this manner, the degradation and failure thresholds are defined with respect to the current members served and do not take into account projected member growth. The scalability server 706 is capable of incorporating the projected member growth and generating reports similar to that of FIG. 6. For example, a degradation threshold of App01 of 400% indicates that App01 can support 400% more of its current members before App01 starts having performance issues, that is, App01 can support 5 million members before having performance issues. Since the projected member growth is below 5 million members, App01 is not included in reports for tweaking or upgrading.

In another embodiment, the degradation and failure thresholds as shown in FIG. 8 are capped at 100%. The organization 700 may only provide scalability information for how an application performs under a ×N increase, and if an application exceeds expectation, the degradation and failure thresholds are relegated to 100%.

In another embodiment, the degradation and failure thresholds may not be defined with respect to the current members served. The thresholds may be defined with respect to a generic number of members to be served. In one example, the generic number of members to be served is a ×M increase of the number of members served at a business unit with the maximum number of current members served. In another example, the generic number of members to be served is a ×M increase of a previous test value used for scalability analysis. In these two instances, M is a real number greater than 1, and after scaling by M, the generic number may be rounded to the nearest integer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of assessing scalability of computing infrastructure performed by a scalability server, the method comprising:

receiving, by the scalability server, growth data from one or more client devices, the growth data including growth projection of subunits of an organization;

receiving, by the scalability server, application and infrastructure information from a database, the application and infrastructure information comprises a list of software applications executed by computing hardware of the computing infrastructure;

determining, by the scalability server, scalability of the computing infrastructure using the growth data and the application and infrastructure information to obtain projected use conditions and determining whether each of the software applications executed by the computing hardware performs adequately under the projected use conditions, wherein the determination of whether each of the software applications executed by the computing hardware perform adequately is based on comparing projected run times of each of the software applications against a speed metric threshold;

monitoring, by the scalability server, real-time performance of the computing infrastructure, wherein the real-time performance of the computing infrastructure comprises real-time utilization of servers, databases, network traffic, memory, and/or storage in the computing infrastructure;

determining, by the scalability server, a priority of components of the computing infrastructure for upgrade using the scalability of the computer infrastructure and the real-time performance of the computing infrastructure, wherein the components comprises the software applications and the computing hardware;

generating, by the scalability server, adjustment parameters for the computing infrastructure, wherein the adjustment parameters are settings to tweak, allocate, and divide current resources in the computing infrastructure to meet future growth demands according to the growth data; and performing, by the scalability server, real-time adjustments of the adjustment parameters to improve performance of the computing infrastructure based on the real-time performance of the computing infrastructure.

2. The method according to claim 1, further comprising: generating report data including the priority of components in the computing infrastructure for upgrade.

3. The method according to claim 1, wherein the application and infrastructure information includes information associated with each subunit of the organization.

4. The method according to claim 1, wherein the priority of components comprises one or more lists of the components ranked based on the determined priority.

5. A scalability server for assessing scalability of computing infrastructure, the scalability server comprising:
a processor; and
a memory storing instructions that when executed by the processor configure the processor to:
receive growth data from one or more client devices, the growth data including growth projection of subunits of an organization;
receive application and infrastructure information from a database, the application and infrastructure information comprises a list of software applications executed by computing hardware of the computing infrastructure;
determine scalability of the computing infrastructure using the growth data and the application and infrastructure information to obtain projected use conditions and determining whether each of the software applications executed by the computing hardware performs adequately under the projected use conditions, wherein the determination of whether each of the software applications executed by the computing hardware perform adequately is based on comparing projected run times of each of the software applications against a speed metric threshold;
monitor real-time performance of the computing infrastructure, wherein the real-time performance of the computing infrastructure includes real-time utilization of servers, databases, network traffic, memory, and/or storage in the computing infrastructure;
determine a priority of components of the computing infrastructure for upgrade using the scalability of the computer infrastructure and the real-time performance of the computing infrastructure, wherein the components comprises the software applications and the computing hardware;
generate adjustment parameters for the computing infrastructure, wherein the adjustment parameters are settings to tweak, allocate, and divide current resources in the computing infrastructure to meet future growth demands according to the growth data; and
performing real-time adjustments of the adjustment parameters to improve performance of the computing infrastructure based on the real-time performance of the computing infrastructure.

6. The server according to claim 5, wherein the processor is further configured to:
generate report data including the priority of components in the computing infrastructure for upgrade.

7. The server according to claim 5, wherein the application and infrastructure information includes information associated with each subunit of the organization.

8. The server according to claim 5, wherein the priority of components comprises one or more lists of the components ranked based on the determined priority.

9. A non-transitory computer readable medium containing computer executable instructions for assessing scalability of computing infrastructure that when executed by a computer, configure the computer to perform steps comprising:
receiving growth data from one or more client devices, the growth data including growth projection of subunits of an organization;
receiving application and infrastructure information from a database, the application and infrastructure information comprises a list of software applications executed by computing hardware of the computing infrastructure;
determining scalability of the computing infrastructure using the growth data and the application and infrastructure information to obtain projected use conditions and determining whether each of the software applications executed by the computing hardware performs adequately under the projected use conditions, wherein the determination of whether each of the software applications executed by the computing hardware perform adequately is based on comparing projected run times of each of the software applications against a speed metric threshold;
monitoring real-time performance of the computing infrastructure, wherein the real-time performance of the computing infrastructure includes real-time utilization of servers, databases, network traffic, memory, and/or storage in the computing infrastructure; and
determining a priority of components of the computing infrastructure for upgrade using the scalability of the computer infrastructure and the real-time performance of the computing infrastructure, wherein the components comprises the software applications and the computing hardware;
generating adjustment parameters for the computing infrastructure, wherein the adjustment parameters are settings to tweak, allocate, and divide current resources in the computing infrastructure to meet future growth demands according to the growth data; and
performing real-time adjustments of the adjustment parameters to improve performance of the computing infrastructure based on the real-time performance of the computing infrastructure.

10. The non-transitory computer readable medium according to claim 9, wherein the computer executed instructions further cause the scalability service to perform steps further comprising:
   generating report data including the priority of components in the computing infrastructure for upgrade.

11. The non-transitory computer readable medium according to claim 9, wherein the priority of components comprises one or more lists of the components ranked based on the determined priority.

* * * * *